(12) United States Patent
Sahita et al.

(10) Patent No.: US 9,158,942 B2
(45) Date of Patent: Oct. 13, 2015

(54) SECURING DISPLAY OUTPUT DATA AGAINST MALICIOUS SOFTWARE ATTACKS

(71) Applicants: Ravi L. Sahita, Portland, OR (US); Vinay Phegade, Beaverton, OR (US); David J. Cowperthwaite, Portland, OR (US)

(72) Inventors: Ravi L. Sahita, Portland, OR (US); Vinay Phegade, Beaverton, OR (US); David J. Cowperthwaite, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 217 days.

(21) Appl. No.: 13/763,914

(22) Filed: Feb. 11, 2013

(65) Prior Publication Data

US 2014/0230067 A1 Aug. 14, 2014

(51) Int. Cl.
*G06F 21/84* (2013.01)
*G06F 21/60* (2013.01)
*G06T 1/60* (2006.01)

(52) U.S. Cl.
CPC . *G06F 21/84* (2013.01); *G06T 1/60* (2013.01); *G06F 21/60* (2013.01)

(58) Field of Classification Search
None
See application file for complete search history.

(56) References Cited

U.S. PATENT DOCUMENTS

| | | | |
|---|---|---|---|
| 7,941,860 B2 | 5/2011 | Poisner | |
| 7,958,320 B2 | 6/2011 | Raikin et al. | |
| 8,122,496 B2 | 2/2012 | Achari et al. | |
| 2005/0188198 A1 | 8/2005 | Ellison et al. | |
| 2005/0283602 A1* | 12/2005 | Vembu et al. | 713/150 |
| 2006/0136910 A1 | 6/2006 | Brickell et al. | |
| 2007/0106986 A1 | 5/2007 | Worley, Jr. | |
| 2009/0064312 A1 | 3/2009 | Furuichi et al. | |
| 2011/0047376 A1 | 2/2011 | Mittal | |
| 2012/0255017 A1 | 10/2012 | Sallam | |

FOREIGN PATENT DOCUMENTS

| | | |
|---|---|---|
| EP | 1 920 375 A2 | 5/2008 |
| EP | 2 107 486 A2 | 10/2009 |
| EP | 2 107 486 A3 | 5/2012 |
| WO | 2007/021513 A2 | 2/2007 |
| WO | 2007/021513 A3 | 4/2007 |

OTHER PUBLICATIONS

Extended European Search Report received for European Patent Application No. 14154450.2, mailed on Apr. 9, 2014, 6 pages.
Intel,"Intel® Virtualization Technology and Intel® Active Management Technology in Retail Infrastructure", Enabling a Robust, Reliable and Manageable Retail Infrastructure Solutions at Low Total Cost of Ownership (TCO), White Paper, Revision 1.0, Dec. 2006, pp. 1-21.

* cited by examiner

*Primary Examiner* — Alexander Lagor
(74) *Attorney, Agent, or Firm* — Lynch Law Patent Group, P.C.

(57) ABSTRACT

Systems, apparatus and methods are described including operations for securing display output data against malicious software attacks.

26 Claims, 7 Drawing Sheets

200

```
REGISTER A PROCESS AS A PROTECTED PROCESS VIA A TRUSTED
MEMORY SERVICE LAYER
202
          ↓
MARK A PORTION OF A PROCESS ADDRESS SPACE AS AN ISOLATED
DISPLAY BUFFER AND ANOTHER PORTION OF THE PROCESS ADDRESS
SPACE AS A PLACE HOLDER BUFFER
204
          ↓
MARK A PORTION OF A GRAPHICS MEMORY SPACE AS AN ACCESS
CONTROLLED GRAPHICS MEMORY REGION
206
          ↓
PROVIDE A VIRTUAL SPRITE DEVICE AND AN ASSOCIATED VIRTUAL
SPRITE MEMORY REGION
208
          ↓
INVOKE AN APPLICATION PROGRAMMING INTERFACE VIA A WINDOWS
MANAGER TO RECEIVE INFORMATION ASSOCIATED WITH THE PLACE
HOLDER BUFFER
210
          ↓
TRANSFER THE SENSITIVE DATA IN THE ISOLATED DISPLAY BUFFER TO
THE VIRTUAL SPRITE DEVICE MEMORY REGION
212
          ↓
TRANSFER THE SENSITIVE DATA IN THE VIRTUAL SPRITE DEVICE
MEMORY REGION TO THE ACCESS CONTROLLED GRAPHICS MEMORY
REGION
214
          ↓
PROVIDE THE SENSITIVE DATA IN THE ACCESS CONTROLLED
GRAPHICS MEMORY REGION TO A DISPLAY DEVICE
216
```

FIG. 2

SECURING DISPLAY OUTPUT DATA AGAINST MALICIOUS SOFTWARE ATTACKS

BACKGROUND

In a variety of situations, such as online financial transactions or the like, a computing device may need to present information to a user in a non-tampered manner. In such situations, malicious software (i.e., malware) such as kernel mode kernel mode rootkits and/or user-mode rootkits can inject code into a user application. The malicious code may attach key loggers or read memory, such as displayer buffers, and steal users credentials or other data.

In some existing implementations, a display buffer may be protected using encryption (e.g., protected audio video path (PAVP) encryption), hardware isolation, and/or a display protected via a virtual memory manager. However, such implementations may not be available on every platform and, in general, they may be costly and/or difficult to implement.

In various computing implementations, it may be desirable to protect user data and, in particular, sensitive user data (e.g., usernames and passwords, financial account information, or the like) against malware attacks.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart illustrating an example process for securing display output data;

DETAILED DESCRIPTION

Figure 1:
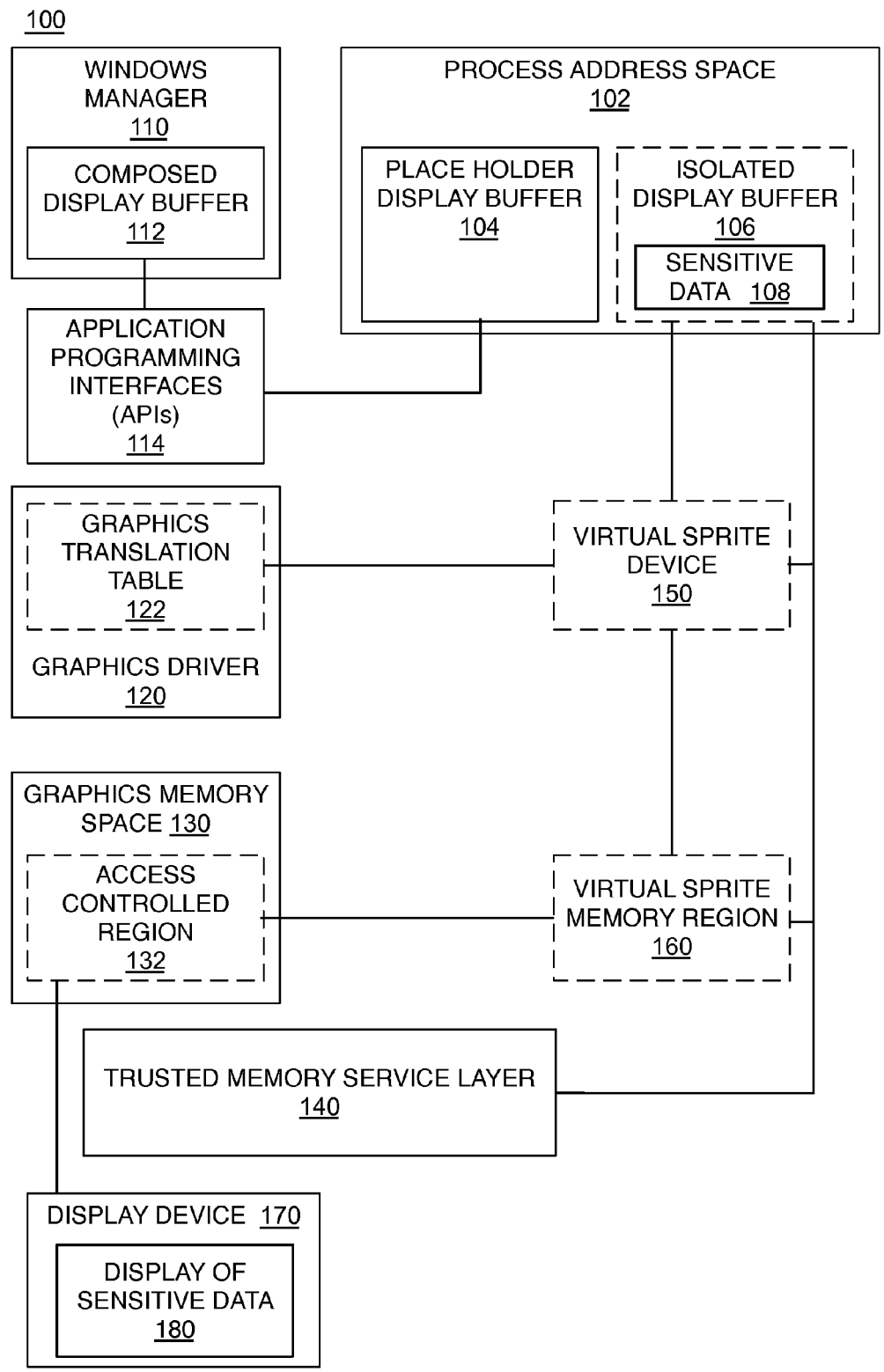
FIG. 1 is an illustrative diagram of an example system for securing display output data.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for securing display output data against malicious software attacks.

As described above, in various computing environments, malware may inject code into a user application that may attach key loggers or read memory, such as displayer buffers, and steal users' credentials or other data.

As described in greater detail below, user data such as, for example, display buffer data (e.g., display data) may be protected against malware attacks. In general, a trusted memory service layer (TMSL) in a computing platform may be a virtual machine extension (VMX) root mode component and may provide various services. For example, the TMSL may provide physical memory views only accessible by whitelisted software (i.e., software known to be validated and trusted). Such physical memory views may be used to secure data into memory inaccessible to non-whitelisted software. In the context of protecting a display buffer from malware, for example, an isolated display buffer may be generated or marked, which may only be accessed by whitelisted or trusted software or code. The TMSL may similarly provide a portion of a graphics memory space (i.e., an access controlled graphics memory region) that may only be accessed by whitelisted or trusted software or code.

Further, the TMSL may be capable of generating or emulating a device such as, for example, a peripheral component interconnect (PCI) or peripheral component interconnect express (PCIe) device. In this context, the TMSL may provide a virtual sprite device and an associated virtual sprite memory region. The virtual sprite device may be implemented via a sprite engine of a graphics processor, for example, and may provide a sprite, an image that may overlay frame buffers. In this context, the sprite may provide an image that copies or emulates a presentation to a user (i.e., the presentation the user would have viewed via a standard graphics pipeline) such that the user sees no change in the information displayed to them. However, as used herein, the sprite may display the same data to the user via a separate and secure graphics pipeline (i.e., a sprite pipeline). In general, the data to be presented to the user may be sensitive data. The sensitive data may be received at a device or system or generated internally via the device or system. For example, the data may include financial data received via a network such as the Internet. Or, for example, the data may be keystroke data (received via a keyboard or virtual keyboard, or the like) received at the device and displayed to the user such as a username, password, or credit card number, or the like.

For illustrative purposes, in a non-protected operation, a graphics pipeline may provide display data to a display device. For example, a display buffer may be accessed by, for example, an application programming interface (API) to provide the data in the display buffer to a windows manager. The windows manager may optionally compose the data and provide it to a graphics driver (which may include a graphics translation table (GTT) for translating virtual addresses to physical addresses), which may provide the data (via a physical memory) to a graphics device, such as a display device. As will be appreciated, such operations may be exposed to a malware attack.

As described in greater detail below, in the discussed implementations, a place holder display buffer (which may contain non-sensitive data, fake data, or the like) may provide data via the discussed pipeline such that any malware attack will find only the non-valuable, non-sensitive data held in the place holder display buffer. To display the (potentially sensitive) data to the user, an alternative graphics pipeline (i.e., a sprite pipeline) may be used. The alternative pipeline may only allow access to whitelisted or trusted software or code. For example, in response to sensitive data being received in the discussed isolated display buffer (or other event triggering the described protective techniques), data held in the place holder display buffer may be provided to the windows manager upon a API being invoked. Further, sensitive data held in the isolated display buffer may be transferred, via a virtual sprite device to a virtual sprite memory region. As discussed, the virtual sprite device and virtual sprite memory region may be known to be secure due to being registered by the TMSL. The sensitive data may be further transferred to the discussed access controlled graphics memory region of the graphics memory space. Also as discussed, the access controlled graphics memory region may be known to be secure due to having a trusted memory view generated by the TMSL. The secure data may then be transferred to a graphics device, such as a display device, for viewing by the user. As will be appreciated, using the described techniques, any malware attack may only receive non-sensitive data and the sensitive data may have bypassed the attacked graphics pipeline for a secure graphics pipeline. Such implementations may provide security for display data.

FIG. 1 is an illustrative diagram of an example system 100 for securing display output data, arranged in accordance with at least some implementations of the present disclosure. As shown, system 100 may include a process address space 102, a windows manager 110, application programming interfaces (APIs) 114, a graphics driver 120 implementing a graphics translation table (GTT) 122, a graphics memory space 130, and a trusted memory service layer (TMSL) 140. System 100 may also include a display device 170. In various implementations, system 100 may be configured to provide security to user data. As is discussed further below, system 100 may be employed via various hardware, firmware, and software implementations.

In some examples, system 100 may include additional items that have not been shown in FIG. 1 for the sake of clarity. For example, system 100 may include one or more central processing units, a radio frequency-type (RF) transceiver, a display, an antenna, an operating system, a graphics processor or the like. Further, system 100 may include additional items such as a speaker, a microphone, an accelerometer, memory, a router, network interface logic, etc. that have not been shown in FIG. 1 for the sake of clarity.

As discussed, system 100 may provide security for user data. As shown, system 100 may include TMSL 140, which may be implemented via one or more central processing units of system 100. As discussed, TMSL 140 may be configured to provide physical memory views only accessible by whitelisted (i.e., software known to be validated and trusted) software, programs, or virtual devices, or the like. In some examples, TMSL 140 may be a virtual machine extension (VMX) root mode component. In some examples, TMSL 140 may be operate in VMX-root mode and use Extended Page Table hardware to isolate physical memory of isolated display buffer 106, control access to GTT 122, control access to virtual sprite memory region 160, and/or control access to graphics memory space 130. In such examples, TMSL 140 may use Extended Page Table virtualization technology for memory management including memory access control and isolation. TMSL 140 may be configured to compartmentalize a kernel virtual addresses space or a process virtual address space into separate physical memory views. Such separation may allow for physical memory views only accessible to whitelisted or trusted software or code (i.e., isolated memory or access controlled memory). Other, non-protected, areas of memory may be accessible to any code, which may be whitelisted or trusted or unknown (and potentially malware, for example).

As shown in FIG. 1, TMSL 140 may provide for isolated display buffer 106, which may only be accessed via a physical memory view by a registered program (e.g., software, virtual devices, or the like), for example. Isolated display buffer 106 may be a portion of process address space 102, for example, and may be marked as isolated via the described physical memory view managed by TMSL 140. The physical memory view associated with isolated display buffer 106 may be described as an isolated display buffer trusted memory view, for example. Further, system 100 may include place holder display buffer 104 as a portion of process address space 102, which may not be protected by a physical memory view.

Further, as shown, TMSL 140 may provide for access controlled region 132 of graphics memory space 130. Access controlled region 132 may only be accessed via a physical memory view by a registered program as managed by TMSL 140, for example. The physical memory view associated with access controlled region 132 may be described as an access controlled region trusted memory view, for example. As shown, graphics driver 120 may include a graphics translation table (GTT) 122. GTT 122 may provide a translation of virtual memory addresses to physical memory addresses such as, for example, translating kernel virtual addresses to physical addresses. In some examples, virtual sprite device 150 (and the operating system and/or other devices of system 100) may access and/or control areas of graphics memory space 130 via GTT 122. In the output display security context discussed herein, TMSL 140 may implement a physical memory view to limit which devices and/or the operating system may have access to the GTT to write to graphics memory space 130. In some examples, marking a portion of graphics memory space 130 as access controlled graphics memory region 132 may include accessing GTT 122 via physical memory view implemented via the TMSL 140. In some examples, graphics memory space 130 and virtual sprite memory region 160 may be implemented as a memory mapped input/output (MMIO) memory spaces. For example, virtual sprite memory region 160 may be a 1:1 copy or remapping of graphics memory space 130. In some examples, the discussed implementations may include disabling a blitter (BLT) engine and enabling monitoring of GTT 122 via the operating system of system 100. Upon completion of the secure presentation of display data, monitoring of GTT 122 may be disabled and the blitter engine may be enabled. Further, upon completion of the secure presentation of display data, access controlled region 132 and/or isolated display buffer 106 may be disabled and returned for general usage by system 100.

It should be noted that TMSL 140 may provide individual physical memory views having the same or different properties such as, for example, lists of programs or virtual devices that may access the individual physical memory views. In the context of protecting isolated display buffer 106 and access controlled region 132, the physical memory views may each allow access via virtual sprite device 150 and virtual sprite memory region 160; however, they may allow access to other differing programs (if any) as needed.

Also as discussed TMSL 140 may be TMSL may be configured to generate or emulate a device. For example, TMSL 140 may provide virtual sprite device 150 and virtual sprite memory device region 160. Further, various components of system 100 may need to be loaded or set-up prior to protecting sensitive data 108, for example. To set-up and/or load various components of system 100, TMSL 140 may be loaded using any suitable techniques such as, for example, during a boot up of system 100 or upon opening a secure application platform or the like. TMSL 140 may expose an (as yet) unverified virtual sprite device driver (i.e., software that operates a virtual sprite device). The unverified sprite device driver may be loaded via the operating system. Upon successfully loading the virtual sprite device driver, TMSL 140 may determine whether the unverified virtual sprite device driver is included on a provisioned whitelist (i.e., that the sprite device driver is whitelisted). If the unverified virtual sprite device driver is whitelisted, the virtual sprite device may be registered by TMSL 140, allowed to operate, provided associated virtual memory space, and/or have access to various physical memory views, for example. In other implementations TMSL 140 may load only expose a virtual sprite device driver known or flagged to be whitelisted.

As discussed, in some implementations, virtual sprite device 150 may be exposed and/or emulated as a PCI or PCIe virtual device. In such implementations, virtual sprite device 150 may need to be enumerated by the operating system as a PCI or PCIe device. In some examples, TMSL 140 may be loaded and the unverified virtual sprite device may be exposed prior to the operating system enumerating PCI or PCIe devices. In other examples, TMSL 140 may be loaded after the operating system has enumerated PCI or PCIe devices, and the unverified virtual sprite device may be exposed as a hot-plug device that invokes an operating system device manager to rescan a PCI or PCIe bus.

Returning now to the discussion of virtual sprite device 150 and virtual sprite memory device region 160, virtual sprite device 150 and virtual sprite memory device region 160 may have access to isolated display buffer 106 and access controlled region 132. Virtual sprite device 150 may be implemented via a sprite engine of a graphics processor, for example, and may provide a sprite, an image that may overlay frame buffers. As discussed, a sprite may provide an image that copies or emulates a presentation to a user and may be used herein may present the same data to the user via a separate and secure graphics pipeline (i.e., a sprite pipeline). As shown in FIG. 1, the data to be presented to the user may be sensitive data 108. In general, sensitive data 108 may include any data that may need to be protected from malware such as, for example, usernames and passwords, financial account information, or the like. Sensitive data may be received at system 100 or generated internally via system 100. For example, sensitive data 108 may include financial data received via a network such as the Internet. Or, for example, sensitive data 108 may be keystroke data (received via a keyboard or virtual keyboard, or the like) received at the device and displayed to the user such as a username, password, or credit card number, or the like.

The process for protecting sensitive data 108 may be invoked in response to sensitive data 108 being received at isolated display buffer 106 or in response to another triggering event. Usage of isolated display buffer 106 may be triggered by any suitable event such as, for example, the identification of data coming from a protected process being associated with a hardware protected environment or a protected process registering for protection with TMSL 140. In general, a process (e.g., a software program) associated with sensitive data 108 may be previously registered by TMSL 140 as a protected (e.g., trusted) process. Such a registration may include determining, via TMSL 140, whether the process is a whitelisted process or another verification technique. The protected process may include any suitable process such as, for example, a user mode process, a process related to a financial transaction, an online financial transaction, another online transaction, or the like.

In response to the reception of sensitive data 108 at isolated display buffer 106, one or more APIs 114 may be invoked into or via windows manager 110 to receive information such as, for example, coordinates or other graphical information, associated with place holder display buffer 104 associated with the protected process. As discussed, such an operation or operations may be typical in providing data from a display buffer to a graphics pipeline for display to a user. As discussed, in the described techniques, place holder display buffer 104 may include only non-sensitive data, or even fake data, or the like such that any malware attacking the data will not receive sensitive data 108 for example, such that sensitive data 108 may be protected. Further, as discussed, to display sensitive data 108 to the user via display device 170, a separate graphics pipeline may be used. In general, APIs 114 may include any suitable APIs such as, for example, DirectX APIs available on Microsoft Windows.

Sensitive data 108 in isolated display buffer 106 may be transferred to virtual sprite memory region 160, via virtual sprite device 150, for example. As discussed, virtual sprite device 150 may be a trusted, whitelisted program such that there is little or no threat that the access to isolated display buffer 106 is being performed by malware. Sensitive data 108 in virtual sprite memory region 160 may be transferred to access controlled region 132 via virtual sprite device 150, for example. In other examples, sensitive data 108 may be transferred to access controlled region 132 via TMSL 140. In either event, as sensitive data 108 may have been delivered to graphics memory space 130 via a protected graphics pipeline (e.g., a sprite pipeline).

Sensitive data 108 may be transferred or provided to display device 170 via any suitable technique from access controlled region 132 of graphics memory space 130 for display as display of sensitive data 180. In general, display device 170 may include any display device such as, for example, a monitor, either integrated with system 100 or provided separately and communicatively coupled (e.g., via wired or wireless connection) to other components of system 100 to receive sensitive data 108 for display.

As discussed, some implementations may include disabling a blitter (BLT) engine and enabling monitoring of GTT 122 via the operating system of system 100. Upon completion of the secure presentation of display data, monitoring of GTT 122 may be disabled and the blitter engine may be enabled. Further, upon completion of the secure presentation of display data, access controlled region 132 and/or isolated display buffer 106 may be disabled and returned for general usage by system 100.

In general, the operations discussed with respect to FIG. 1 and elsewhere herein may secure display output data. Further, as discussed, although any malware present in system 100 may access place holder display buffer 104, it may not access isolated display buffer 106.

As will be discussed in greater detail below, system 100 or other system discussed herein may be used to perform some or all of the various functions discussed below in connection with FIGS. 2-4, or the operations previously discussed with respect to FIG. 1.

FIG. 2 is a flow chart illustrating an example process 200 for securing display output data, arranged in accordance with at least some implementations of the present disclosure. In the illustrated implementation, process 200 may include one or more operations, functions or actions as illustrated by one or more of blocks 202, 204, 206, 208, 210, 212, 214, and/or 216. By way of non-limiting example, process 200 will be described herein with reference to example system 100 of FIG. 1.

Process 200 may be utilized as a computer-implemented method for securing display output data. Process 200 may begin at block 202, "REGISTER A PROCESS AS A PROTECTED PROCESS VIA A TRUSTED MEMORY SERVICE LAYER", where a process may be registered, via a trusted memory service layer, as a protected process. Registering a process may include determining whether the process is a whitelisted process, for example. The protected process may include any suitable process such as, for example, a process related to a financial transaction, an online financial transaction, another online transaction, or the like.

Processing may continue from operation 202 to operation 204, "MARK A PORTION OF A PROCESS ADDRESS SPACE AS AN ISOLATED DISPLAY BUFFER AND ANOTHER PORTION OF THE PROCESS ADDRESS SPACE AS A PLACE HOLDER BUFFER", where a portion of a process address space may be marked as an isolated display buffer and another portion of the process address space may be marked as a place holder buffer. The isolated display buffer may be protected and only accessed via a trusted memory view managed via the trusted memory service layer, for example. The place holder buffer may be unprotected (e.g., open to the operating system, various programs and processes, and, potentially, malware), for example.

Processing may continue from operation 204 to operation 206, "MARK A PORTION OF A GRAPHICS MEMORY SPACE AS AN ACCESS CONTROLLED GRAPHICS MEMORY REGION", where a portion of a graphics memory space may be marked as an access controlled graphics memory region. The access controlled graphics memory region may be protected and only accessed via a trusted memory view managed via the trusted memory service layer, for example.

Processing may continue from operation 206 to operation 208, "PROVIDE A VIRTUAL SPRITE DEVICE AND AN ASSOCIATED VIRTUAL SPRITE MEMORY REGION", where a virtual sprite device and an associated virtual sprite memory region may be provided. The virtual sprite device may be registered and provided via the trusted memory service layer, for example. The virtual sprite device may access the isolated display buffer and/or the access controlled graphics memory region, for example. The associated virtual sprite memory region may be a memory mapped input/output (MMIO) memory space and may have a 1:1 correspondence or mapping to the access controlled graphics memory region, for example.

Processing may continue from operation 208 to operation 210, "INVOKE AN APPLICATION PROGRAMMING INTERFACE VIA A WINDOWS MANAGER TO RECEIVE INFORMATION ASSOCIATED WITH THE PLACE HOLDER BUFFER", where one or more application programming interfaces (APIs) may be invoked via a window manager to receive information associated with the place holder buffer. The information associated with the place holder buffer may include coordinates or other graphical information, for example. In the situation where a malware attack is in progress, the malware may attack data held in the place holder buffer, which may include only non-sensitive data, or even fake data, or the like.

Processing may continue from operation 210 to operation 212, "TRANSFER THE SENSITIVE DATA IN THE ISOLATED DISPLAY BUFFER TO THE VIRTUAL SPRITE DEVICE MEMORY REGION", where the sensitive data in the isolated display buffer may be transferred to the virtual sprite device memory region. The isolated display buffer may be secured along a sprite graphics pipeline for secure presentation to a user, for example.

Processing may continue from operation 212 to operation 214, "TRANSFER THE SENSITIVE DATA IN THE VIRTUAL SPRITE DEVICE MEMORY REGION TO THE ACCESS CONTROLLED GRAPHICS MEMORY REGION", where the sensitive data in the virtual sprite device memory region may be transferred to the access controlled graphics memory region. The sensitive data may be transferred via the virtual sprite device and/or the virtual sprite device memory region, for example.

Processing may continue from operation 214 to operation 216, "PROVIDE THE SENSITIVE DATA IN THE ACCESS CONTROLLED GRAPHICS MEMORY REGION TO A DISPLAY DEVICE", where the sensitive data in the access controlled graphics memory region may be transferred to a display device. The sensitive data may be displayed to the user, for example. As discussed, the user may view a display of the sensitive data without witnessing any difference between the display of the sensitive data presented via the sprite pipeline and a display the user would have seen if a standard graphics pipeline were used to present the data to the user.

Some additional and/or alternative details related to process 200 may be illustrated in one or more examples of implementations discussed in greater detail below with regard to FIGS. 3 and/or 4.

Figure 3:
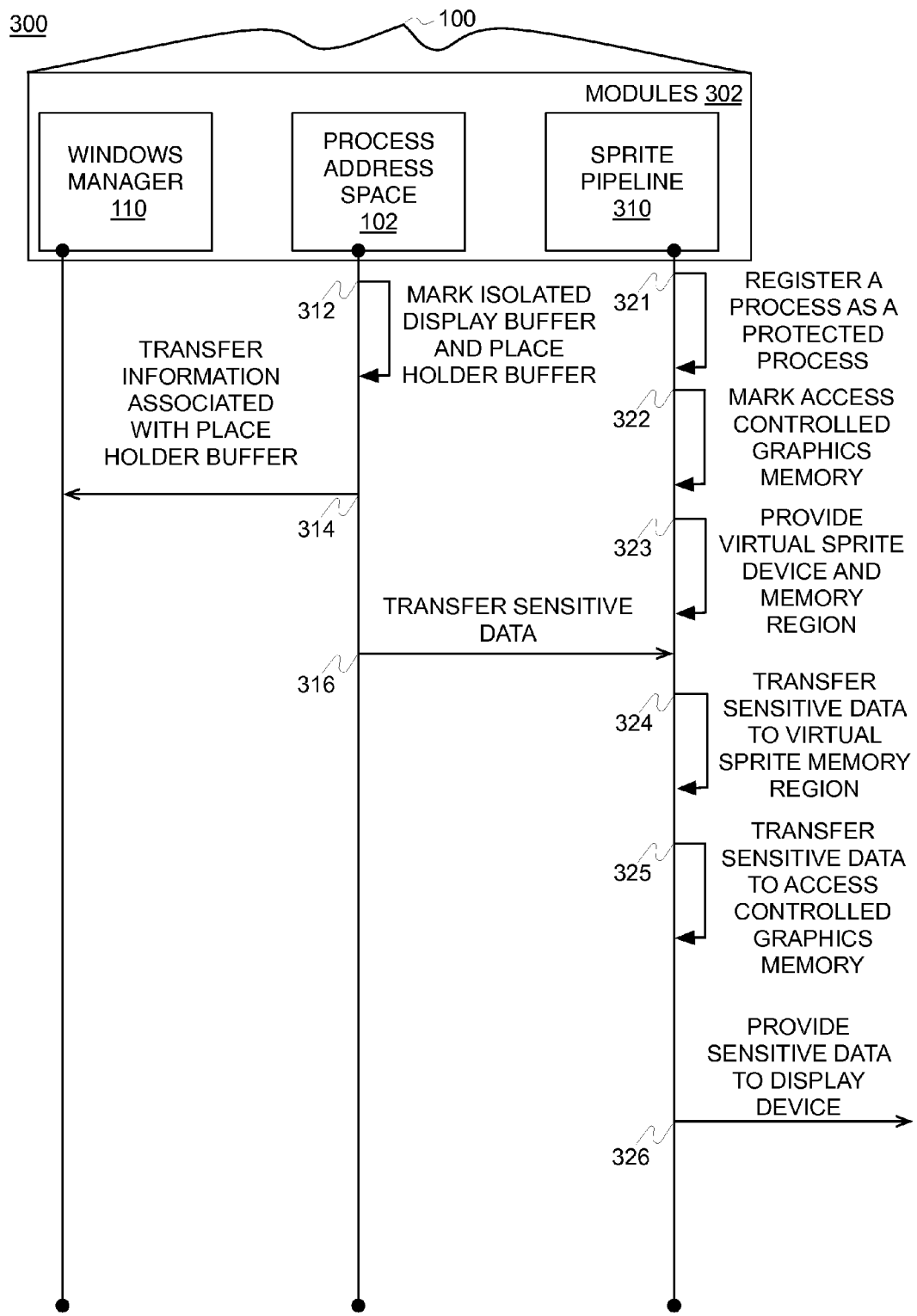
FIG. 3 is an illustrative diagram of an example process for securing display output data in operation.

FIG. 3 is an illustrative diagram of example system 100 and process 300 in operation, arranged in accordance with at least some implementations of the present disclosure. In the illustrated implementation, process 300 may include one or more operations, functions or actions as illustrated by one or more of actions 312, 314, 316, 321, 322, 323, 324, 325, and/or 326. By way of non-limiting example, process 300 will be described herein with reference to example video coding system 100 of FIG. 1.

In the illustrated implementation, system 100 may include modules 302, the like, and/or combinations thereof. For example, modules 302, may include windows manager 110, process address space 102 and sprite pipeline 310, the like, and/or combinations thereof. Windows manager 110 may be configured to receive information associated with place holder buffer 104. As discussed, the information associated with place holder 104 buffer may include non-sensitive or fake data or the like. Process address space 102 may be configured to include isolated display buffer 106 for handling sensitive data 108 and place holder display buffer 104, for example. Sprite pipeline 310 may include virtual sprite device 150, virtual sprite memory region 160, access controlled region 132, trusted memory service layer 140, or combinations thereof. Sprite pipeline 310 may also include graphics translation table 122 implemented via graphics driver 120 and graphics memory space 130, for example. Sprite pipeline 310 may be configured to transfer sensitive data 108 from isolated memory buffer 106 to virtual sprite memory region 160 and further to access controlled region 132 via a path protected from potential malware attacks. Sprite 310 may transfer sensitive data to display device 170 for display to a user as display of sensitive data 180. Although system 100, as shown in FIG. 3, may include one particular set of blocks or actions associated with particular modules, these blocks or actions may be associated with different modules than the particular module illustrated here.

Process 300 may be utilized as a computer-implemented method for cross-layer cross-channel residual prediction. Process 300 may begin at block 312, "MARK ISOLATED DISPLAY BUFFER AND PLACE HOLDER BUFFER", where a portion of process address space 102 may be marked as isolated display buffer 106 and another portion of process address space 102 may be marked as place holder buffer 104. Isolated display buffer 106 may be protected and only accessed via a trusted memory view managed via trusted memory service layer (TMSL) 140, for example. The place holder buffer 140 may be unprotected (e.g., open to the operating system, various programs and processes, and, potentially, malware), for example.

Processing may continue from operation 312 to operation 321, "REGISTER A PROCESS AS A PROTECTED PROCESS", where a process may be registered, via TMSL 140, as a protected process. Registering a process may include determining, via a predetermined whitelist managed via a TMSL 140, whether the process is a whitelisted process, for example. The protected process may include any suitable process such as, for example, a process related to a financial transaction, an online financial transaction, another online transaction, or the like.

Processing may continue from operation 321 to operation 322, "MARK ACCESS CONTROLLED GRAPHICS MEMORY", where a portion of graphics memory space 130 may be marked as access controlled graphics memory region 132. Access controlled graphics memory region 132 may be protected and only accessed via a trusted memory view managed via the TMSL 140, for example.

Processing may continue from operation 322 to operation 323, "PROVIDE VIRTUAL SPRITE DEVICE AND MEMORY REGION", where virtual sprite device 150 and associated virtual sprite memory region 160 may be provided. Virtual sprite device 150 may be registered and provided via the TMSL 140, for example. Virtual sprite device 150 may access isolated display buffer 106 and/or access controlled region 132, for example. Associated virtual sprite memory region 160 may be a memory mapped input/output (MMIO) memory space and may have a 1:1 correspondence or mapping to access controlled graphics memory region 132, for example.

Processing may continue from operation 323 to operation 324, "TRANSFER SENSITIVE DATA TO VIRTUAL SPRITE MEMORY REGION", where sensitive data 108 in isolated display buffer 106 may be transferred to virtual sprite memory region 160. Isolated display buffer 106 may be secured along sprite pipeline 310 for secure presentation to a user, for example.

Processing may continue from operation 324 to operation 325, "TRANSFER SENSITIVE DATA TO ACCESS CONTROLLED GRAPHICS MEMORY", where sensitive data 108 in virtual sprite memory region 160 may be transferred to access controlled region 132. Sensitive data 108 may be transferred via virtual sprite device 150 and/or virtual sprite memory region 160, for example.

Processing may continue from operation 325 to operation 326, "PROVIDE SENSITIVE DATA TO DISPLAY DEVICE", where sensitive data 108 in access controlled region 132 may be transferred to display device 170. Sensitive data 108 may be displayed to a user, for example, as display of sensitive data 180. As discussed, the user may view display of sensitive data 180 without witnessing any difference between display of sensitive data 180 presented via sprite pipeline 310 and a display of data the user would have seen if a standard graphics pipeline were used to present the data to the user.

Figure 4:
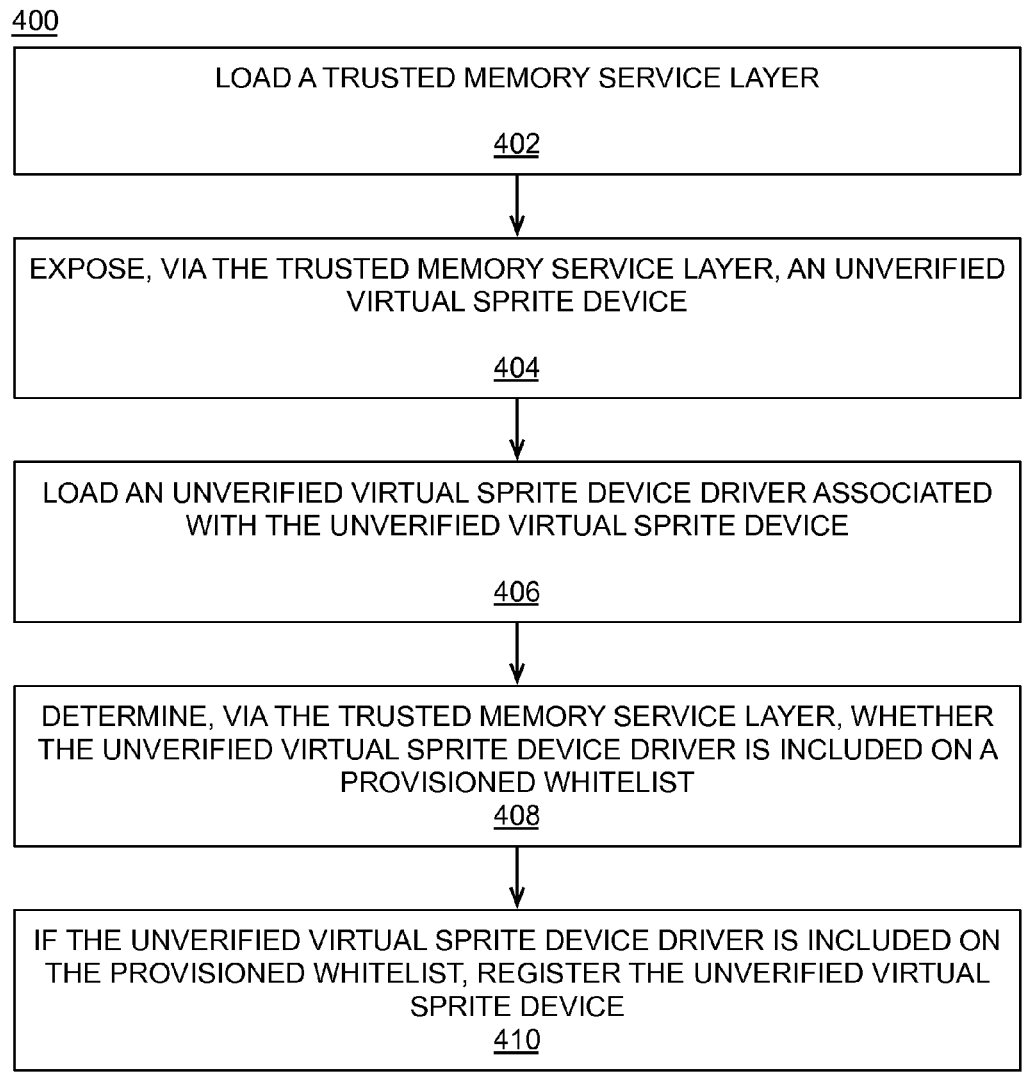
FIG. 4 is a flow chart illustrating an example process for preparing a system to secure display output data.

FIG. 4 is a flow chart illustrating an example process 400 for preparing a system to secure display output data, arranged in accordance with at least some implementations of the present disclosure. In the illustrated implementation, process 400 may include one or more operations, functions or actions as illustrated by one or more of blocks 402, 404, 406, 408, and/or 410. By way of non-limiting example, process 400 will be described herein with reference to example system 100.

Process 400 may be utilized as a computer-implemented method for securing display output data. Process 400 may begin at block 402, "LOAD A TRUSTED MEMORY SERVICE LAYER", where trusted memory service layer (TMSL) 140 may be loaded. TMSL 140 may be loaded during a boot up of system 100 or upon opening a secure application platform or the like, for example. TMSL 140 may include a virtual machine extension root mode component, for example.

Processing may continue from operation 402 to operation 404, "EXPOSE, VIA THE TRUSTED MEMORY SERVICE LAYER, AN UNVERIFIED VIRTUAL SPRITE DEVICE", where an unverified virtual sprite device may be exposed via or by TMSL 140. The unverified sprite device may be exposed by TMSL 140 in any suitable manner. For example, TMSL may be configured to hook and/or emulate port access to allow customized haling of PCI or PCIe and such capability may be utilized to expose the unverified sprite device.

Processing may continue from operation 404 to operation 406, "LOAD AN UNVERIFIED VIRTUAL SPRITE DEVICE DRIVER ASSOCIATED WITH THE UNVERIFIED VIRTUAL SPRITE DEVICE", where an unverified virtual sprite device driver associated with the unverified virtual sprite device may be loaded. The unverified virtual sprite device driver may be loaded using any suitable techniques such as, for example, loading the unverified virtual sprite device driver via the operating system of system 100.

Processing may continue from operation 406 to operation 408, "DETERMINE, VIA THE TRUSTED MEMORY SERVICE LAYER, WHETHER THE UNVERIFIED VIRTUAL SPRITE DEVICE DRIVER IS INCLUDED ON A PROVISIONED WHITELIST", where it may be determined, via TMSL 140, whether the unverified virtual sprite device driver is included on a provisioned whitelist. As discussed, TMSL 140 may manage a whitelist of trusted and/or secure programs and/or code. TMSL 140 may determine whether the unverified virtual sprite device driver may be included on the whitelist. As discussed, if the unverified virtual sprite device driver is included on the whitelist, the unverified virtual sprite device driver may be deemed secure. If it is not on the whitelist, the unverified virtual sprite device driver may be deemed unknown and may not be allowed to be registered, loaded, or operated, or the like.

Processing may continue from operation 408 to operation 410, "IF THE UNVERIFIED VIRTUAL SPRITE DEVICE DRIVER IS INCLUDED ON THE PROVISIONED WHITELIST, REGISTER THE UNVERIFIED VIRTUAL SPRITE DEVICE", where, if the unverified virtual sprite device driver is deemed to be included on the provisioned whitelist, the virtual sprite device may be registered by TMSL 140, allowed to operate, provided associated virtual memory space, and/or have access to various physical memory views, for example.

Using such techniques, a secure sprite pipeline may be set-up or configured on system 100. As discussed, the secure sprite pipeline may be an alternative pipeline to the standard graphics pipeline and may provide security for sensitive data against malware attacks directed at the output display data of system 100.

While implementation of example processes 200, 300, 400, and processes discussed with respect to FIG. 1 may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 1-4, and processes discussed with respect to FIG. 1, may be undertaken in response to instructions provided by one or more computer-program products. Such program products may include signal bearing media providing instructions that, when executed by, for example, a processor, may provide the functionality described herein. The computer-program products may be provided in any form of computer-readable medium. Thus, for example, a processor including one or more processor core(s) may undertake one or more of the blocks shown in FIGS. 1-4.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
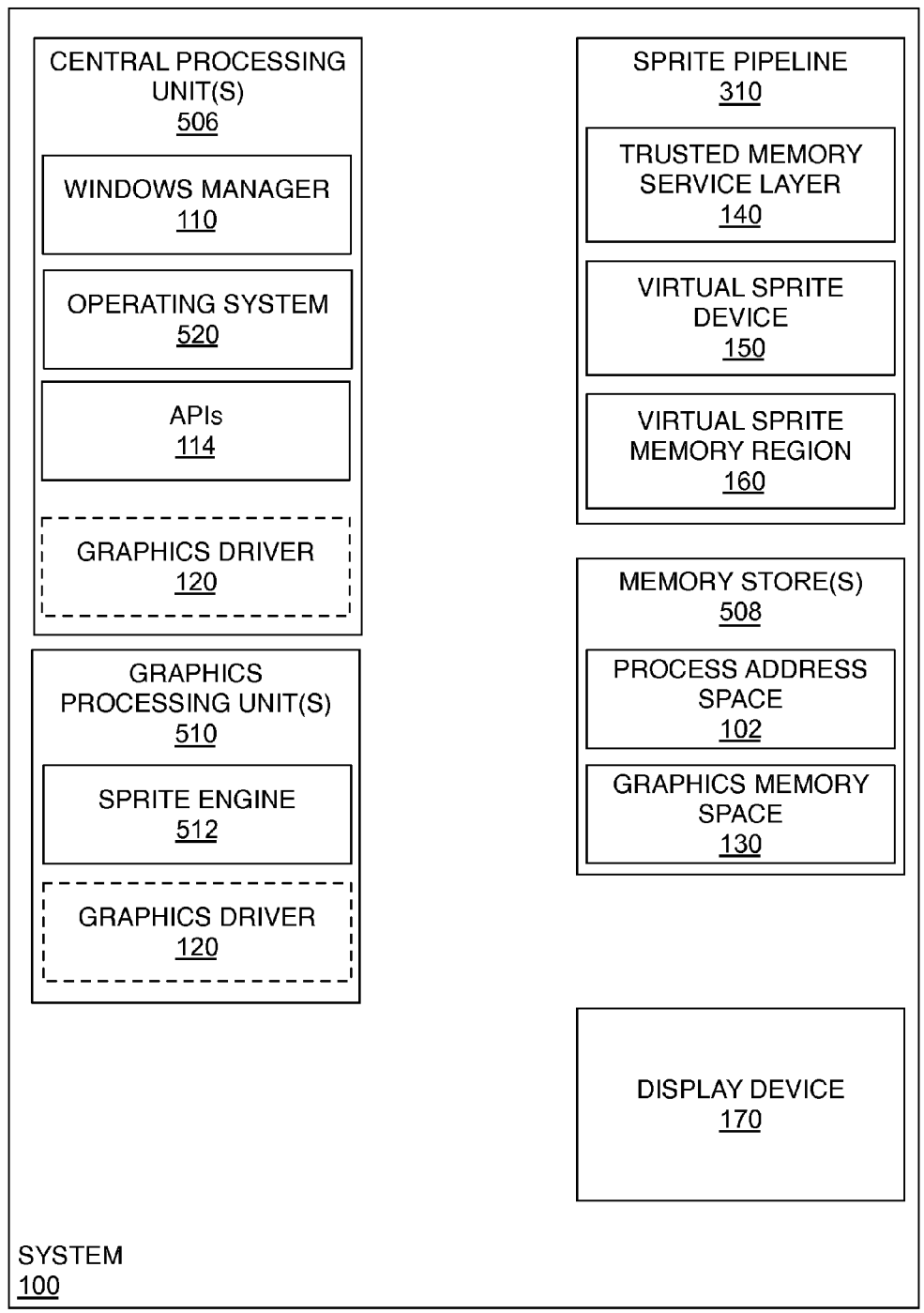
FIG. 5 is an illustrative diagram of an example system for securing display output data.

FIG. 5 is an illustrative diagram of a system 100 for securing display output data, arranged in accordance with at least some implementations of the present disclosure. In the illustrated implementation, system 100 may include one or more central processing units 506, one or more memory stores 508, one or more graphics processing units 510, sprite pipeline 310, and/or display device 170. Central processing units 506, memory store 508, graphics processing units 510, and sprite pipeline 310 may be capable of communication with one another, via, for example, a bus or other access. In various implementations, display device 170 may be integrated in system 100 or implemented separately from system 100.

As shown, central processing units 506 may implement windows manager 110, operating system 520, and application programming interfaces (APIs) 114; graphics processing units 510 may include sprite engine 512; sprite pipeline 310 may include trusted memory service layer (TMSL) 140, virtual sprite device 150, and virtual sprite memory region 160; and memory stores 508 may include process address space 102 and graphics memory space 130, which may include access controlled region 132, which is not shown for the sake of clarity. Further as shown, graphics driver 120 may be implemented via central processing units 506 and/or graphics processing units 510.

As will be appreciated, the modules illustrated in FIG. 5 may include a variety of software and/or hardware modules and/or modules that may be implemented via software and/or hardware. For example, virtual sprite device 150 may be implemented as software via central processing units 506 and/or graphics processing units 510. Further, the shown memory stores 508 may be shared memory for central processing units 506 and/or graphics processing units 510, for example. Also, system 100 may be implemented in a variety of ways. For example, system 100 (excluding display device 170) may be implemented as a single chip or device having a graphics processor, a quad-core central processing unit, on-board cache, and a memory controller input/output (I/O) module (not shown). In other examples, system 100 (again excluding display device 170) may be implemented as a chipset.

For example, trusted memory service layer 140 may be implemented via central processing units 506, virtual sprite device 130 may be implemented via sprite engine 512 of graphics processing units 510, process address space 102 may be implemented via memory stores 508, graphics memory space 114 may be implemented via memory stores 508, windows manager 110 may be implemented via the central processing units 506, the graphics translation table (not shown in FIG. 5) may be implemented via graphics driver 120, and graphics driver 120 may be implemented via one of central processing units 506 or graphics processing units 510.

Central processing units 506 may include any suitable implementation including, for example, microprocessor(s), multicore processors, application specific integrated circuits, chip(s), chipsets, or the like. Further, graphics processing units 510 may include any suitable implementation including, for example, processor(s), multicore processors, application specific integrated circuits, programmable logic devices, graphics cards, integrated graphics, general purpose graphics processing unit(s), or the like. In addition, memory stores 508 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 508 may be implemented by cache memory. As discussed, in various examples, system 100 may be implemented as a chipset or as a system on a chip. Operating system 520 may include any suitable operating system such as, for example, a Microsoft Windows based operating system.

Figure 6:
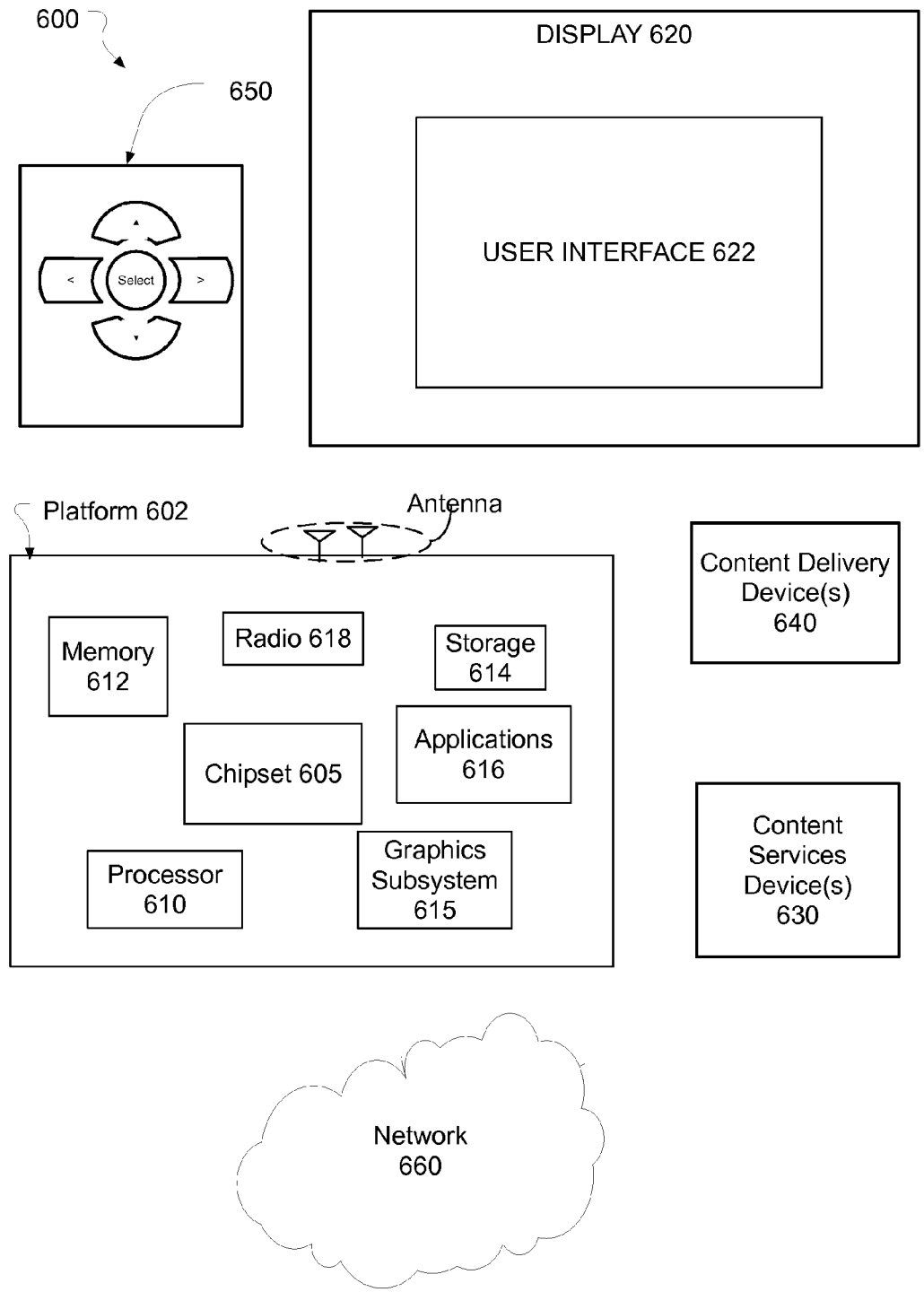
FIG. 6 is an illustrative diagram of an example system.

FIG. 6 illustrates an example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, Display Port, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general-purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
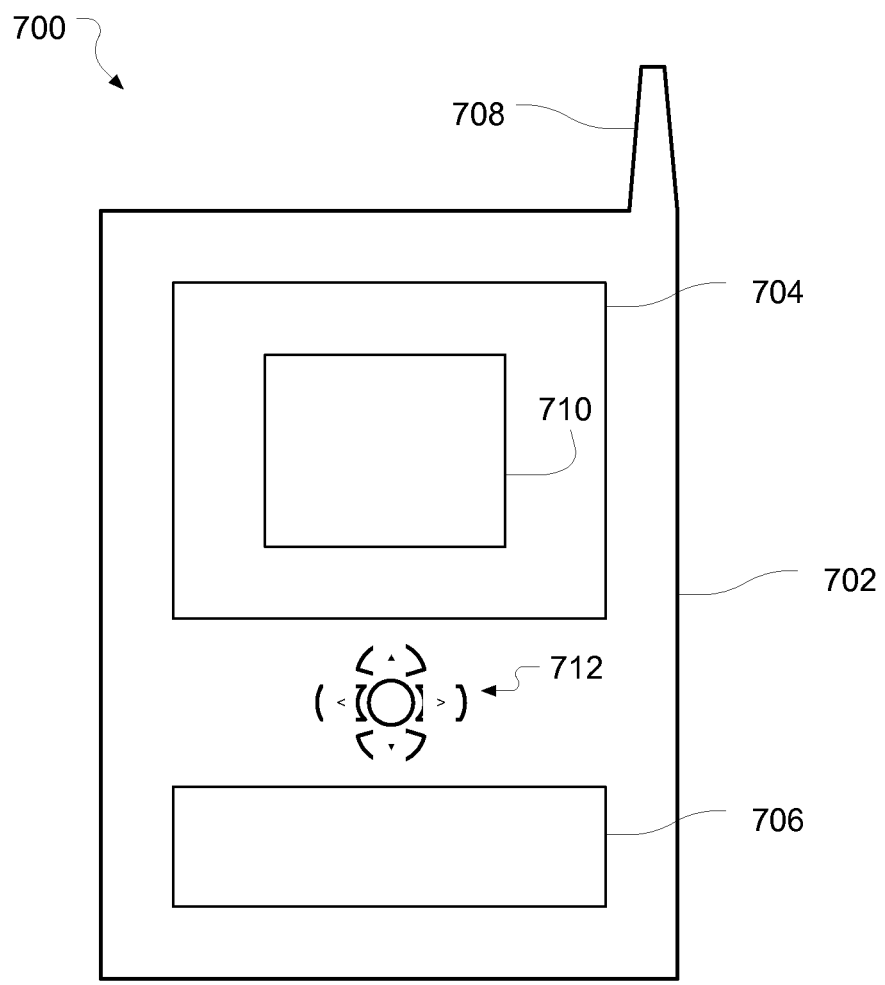
FIG. 7 is an illustrative diagram of an example system, all arranged in accordance with at least some implementations of the present disclosure.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for securing display output data may include registering a process as a protected process via a trusted memory service layer. A portion of a process address space may be marked as an isolated display buffer associated with the protected process and another portion of the process address space may be marked as a place holder display buffer associated with the protected process. A portion of a graphics memory space may be marked as an access controlled graphics memory region. A virtual sprite device and an associated virtual sprite memory region may be provided. In response to the reception of sensitive data into the isolated display buffer, an application programming interface may be invoked via a windows manager to receive information associated with the place holder display buffer associated with the protected process. The sensitive data in the isolated display buffer may be transferred to the virtual sprite device memory region. The sensitive data in the virtual sprite device memory region may be transferred to the access controlled graphics memory region. The sensitive data in the access controlled graphics memory region may be provided to a display device.

In a further example of a computer-implemented method for securing display output data, the trusted memory service layer may be loaded. An unverified virtual sprite device may be exposed via the trusted memory service layer. An unverified virtual sprite device driver associated with the unverified virtual sprite device may be loaded via an operating system. It may be determined, via the trusted memory service layer, whether the unverified virtual sprite device driver is included on a provisioned whitelist. If the unverified virtual sprite device driver is included on the provisioned whitelist, the unverified virtual sprite device may be registered as the virtual sprite device via the trusted memory service layer. An isolated display buffer trusted memory view may be created, via the trusted memory service layer, such that the isolated display buffer trusted memory view allows access to the isolated display buffer only via a registered program, and such that the virtual sprite device is a registered program. An access controlled graphics memory region trusted memory view may be created, via the trusted memory service layer, such that the access controlled graphics memory region trusted memory view allows access to the access controlled graphics memory region only via a registered program, and such that the virtual sprite device is a registered program. The sensitive data may be received into the isolated display buffer. Usage of the isolated display buffer may be selectively triggered based on identification of data coming from the protected process being associated with a hardware protected environment or the protected process registering for protection with the trusted memory service layer. A blitter engine may be disabled and monitoring of the graphics translation table may be enabled, via the operating system. The virtual sprite device may be implemented via a sprite engine of a graphics processor and the trusted memory service layer may be implemented via a central processing unit. Marking the portion of the graphics memory space as the access controlled graphics memory region may include accessing a graphics translation table via a graphics translation table physical memory view implemented via the trusted memory service layer, such that the graphics translation table is configured to translate virtual graphics memory addresses to physical graphics memory addresses. The virtual sprite device may be a registered program having access to the isolated display buffer and the access controlled graphics memory region. The trusted memory service layer may be loaded and the unverified virtual sprite device may be exposed prior to the operating system enumerating Peripheral Component Interconnect Express devices. The trusted memory service layer may be loaded after the operating system enumerates Peripheral Component Interconnect Express devices, and such that exposing the unverified virtual sprite device includes exposing the unverified virtual sprite device as a hot-plug device to invoke an operating system device manager to rescan a Peripheral Component Interconnect Express bus. The information associated with the place holder display buffer may include coordinates of the place holder display buffer. The protected process may include a process related to an online financial transaction. The place holder display buffer may be open to the operating system and the isolated display buffer may be isolated from the operating system. The graphics memory space may include a memory mapped input/output (MMIO) memory space. Malware may access the place holder display buffer but not the isolated display buffer. The trusted memory service layer may include a virtual machine extension root mode component.

In another example, a system for securing display output data on a computer may include a display device, one or more processors, one or more memory stores, a process address space including a place holder display buffer, a windows manger, and a sprite pipeline including a trusted memory service layer, a virtual sprite device and an associated virtual sprite memory region. The display device may be configured to display data. The one or more processors may be communicatively coupled to the display device. The one or more memory stores may be communicatively coupled to the one or more processors. The sprite pipeline may be configured to register a process as a protected process via the trusted memory service layer, mark a portion of the process address space as an isolated display buffer associated with the protected process, mark a portion of a graphics memory space as an access controlled graphics memory region, receive sensitive data in the isolated display buffer, transfer the sensitive data in the isolated display buffer to the virtual sprite device memory region, transfer the sensitive data in the virtual sprite device memory region to the access controlled graphics memory region, and provide the sensitive data in the access controlled graphics memory region to the display device.

In a further example of a system for securing display output data on a computer, the system may include one or more graphics processors and an operating system. The one or more graphics processors may be communicatively coupled to the one or more processors, and the one or more graphics processors may include a sprite engine. The operating system may be implemented via the one or more processors. The sprite pipeline may be further configured to expose, via the trusted memory service layer, an unverified virtual sprite device, determine, via the trusted memory service layer, whether an unverified virtual sprite device driver is included on a provisioned whitelist, if the unverified virtual sprite device driver is included on the provisioned whitelist, register, via the trusted memory service layer, the unverified virtual sprite device as the virtual sprite device, create, via the trusted memory service layer, an isolated display buffer trusted memory view, such that the isolated display buffer trusted memory view allows access to the isolated display buffer only via a registered program, and such that the virtual sprite device is a registered program, create, via the trusted memory service layer, an access controlled graphics memory region trusted memory view, such that the access controlled graphics memory region trusted memory view allows access to the access controlled graphics memory region only via a registered program, and such that the virtual sprite device is a registered program, receive the sensitive data into the isolated display buffer, selectively trigger usage of the isolated display buffer based on one of identification of data coming from the protected process being associated with a hardware protected environment or the protected process registering for protection with the trusted memory service layer. The operating system may be configured to load the trusted memory service layer, load the unverified virtual sprite device driver associated with the unverified virtual sprite device, disable a blitter engine and enable monitoring of the graphics translation table, and enumerate Peripheral Component Interconnect Express devices, wherein the trusted memory service layer is loaded and the unverified virtual sprite device is exposed prior to the operating system enumerating Peripheral Component Interconnect Express devices and wherein the unverified virtual sprite device is exposed as a hot-plug device to invoke an operating system device manager to rescan a Peripheral Component Interconnect Express bus. The sprite pipeline may be configured to mark the portion of the graphics memory space as the access controlled graphics memory region by accessing a graphics translation table via a graphics translation table physical memory view implemented via the trusted memory service layer, such that the graphics translation table is configured to translate virtual graphics memory addresses to physical graphics memory addresses. The information associated with the place holder display buffer may include coordinates of the place holder display buffer. The protected process may include a process related to an online financial transaction. The place holder display buffer may be open to the operating system and the isolated display buffer may be isolated from the operating system. The graphics memory space may include a memory mapped input/output (MMIO) memory space. Malware may access the place holder display buffer but not the isolated display buffer. The trusted memory service layer may include a virtual machine extension root mode component. The virtual sprite device may be a registered program having access to the isolated display buffer and the access controlled graphics memory region. The trusted memory service layer may be implemented via the one or more processors, the virtual sprite device may be implemented via the sprite engine, the process address space may be implemented via the one or more memory stores, the graphics memory space may be implemented via the one or more memory stores, the windows manager may be implemented via the one or more processors, the graphics translation table may be implemented via a graphics driver, and the graphics driver may be implemented via at least one of the one or more processors or the one or more graphics processors In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:
1. A computer-implemented method for securing display output data, the method comprising:
   registering a process as a protected process via a trusted memory service layer;
   marking a first portion of a process address space as an isolated display buffer associated with the protected process and a second portion of the process address space as a place holder display buffer associated with the protected process;
   marking a portion of a graphics memory space as an access controlled graphics memory region;
   providing a virtual sprite device and an associated virtual sprite memory region;
   invoking, in response to a reception of sensitive data into the isolated display buffer, an application programming interface via a windows manager to receive information associated with the place holder display buffer associated with the protected process;
   transferring the sensitive data in the isolated display buffer to the virtual sprite device memory region;
   transferring the sensitive data in the virtual sprite device memory region to the access controlled graphics memory region; and
   providing the sensitive data in the access controlled graphics memory region to a display device,
   wherein the isolated display buffer is isolated from the operating system via a secure sprite pipeline to protect from potential malware access, wherein the sensitive data is visually presented on the display device via a virtual sprite that overlays and emulates part of an underlying frame buffer data field such that a user is presented with little change in the appearance of the information displayed on the display device, wherein the place holder display buffer is open to the operating system, and wherein fake and/or non-sensitive data corresponding to the sensitive data is associated with the place holder display buffer so as to be open to the operating system and potentially susceptible to malware access.

2. The method of claim 1, further comprising:
creating, via the trusted memory service layer, an isolated display buffer trusted memory view, wherein the isolated display buffer trusted memory view allows access to the isolated display buffer only via a registered program, and wherein the virtual sprite device is a registered program.

3. The method of claim 1, further comprising:
creating, via the trusted memory service layer, an access controlled graphics memory region trusted memory view, wherein the access controlled graphics memory region trusted memory view allows access to the access controlled graphics memory region only via a registered program, and wherein the virtual sprite device is a registered program.

4. The method of claim 1, further comprising:
loading the trusted memory service layer;
exposing, via the trusted memory service layer, an unverified virtual sprite device;
loading, via the operating system, an unverified virtual sprite device driver associated with the unverified virtual sprite device;
determining, via the trusted memory service layer, whether the unverified virtual sprite device driver is included on a provisioned whitelist; and
if the unverified virtual sprite device driver is included on the provisioned whitelist, registering, via the trusted memory service layer, the unverified virtual sprite device as the virtual sprite device.

5. The method of claim 1, further comprising:
loading the trusted memory service layer;
exposing, via the trusted memory service layer, an unverified virtual sprite device;
loading, via the operating system, an unverified virtual sprite device driver associated with the unverified virtual sprite device;
determining, via the trusted memory service layer, whether the unverified virtual sprite device driver is included on a provisioned whitelist; and
if the unverified virtual sprite device driver is included on the provisioned whitelist, registering, via the trusted memory service layer, the unverified virtual sprite device as the virtual sprite device, wherein the trusted memory service layer is loaded and the unverified virtual sprite device is exposed prior to the operating system enumerating Peripheral Component Interconnect Express devices.

6. The method of claim 1, further comprising:
selectively triggering usage of the isolated display buffer based at least in part on one of identification of data coming from the protected process being associated with a hardware protected environment or the protected process registering for protection with the trusted memory service layer.

7. The method of claim 1, further comprising:
implementing the sprite device via a sprite engine of a graphics processor and implementing the trusted memory service layer via a central processing unit.

8. The method of claim 1, wherein marking the portion of the graphics memory space as the access controlled graphics memory region comprises accessing a graphics translation table via a graphics translation table physical memory view implemented via the trusted memory service layer, wherein the graphics translation table is configured to translate virtual graphics memory addresses to physical graphics memory addresses.

9. The method of claim 1, wherein marking the portion of the graphics memory space as the access controlled graphics memory region comprises accessing a graphics translation table via a graphics translation table physical memory view implemented via the trusted memory service layer, wherein the graphics translation table is configured to translate virtual graphics memory addresses to physical graphics memory addresses, and further comprising:
disabling a blitter engine and enabling monitoring of the graphics translation table, via the operating system.

10. The method of claim 1, wherein the information associated with the place holder display buffer comprises coordinates of the place holder display buffer.

11. The method of claim 1, wherein the protected process comprises a process related to an online financial transaction.

12. The method of claim 1, wherein the graphics memory space comprises a memory mapped input/output (MMIO) memory space.

13. The method of claim 1, further comprising:
loading the trusted memory service layer;
exposing, via the trusted memory service layer, an unverified virtual sprite device;
loading, via an operating system, an unverified virtual sprite device driver associated with the unverified virtual sprite device;
determining, via the trusted memory service layer, whether the unverified virtual sprite device driver is included on a provisioned whitelist;
if the unverified virtual sprite device driver is included on the provisioned whitelist, registering, via the trusted memory service layer, the unverified virtual sprite device as the virtual sprite device;
creating, via the trusted memory service layer, an isolated display buffer trusted memory view, wherein the isolated display buffer trusted memory view allows access to the isolated display buffer only via a registered program, and wherein the virtual sprite device is a registered program;
creating, via the trusted memory service layer, an access controlled graphics memory region trusted memory view, wherein the access controlled graphics memory region trusted memory view allows access to the access controlled graphics memory region only via a registered program, and wherein the virtual sprite device is a registered program;
receiving the sensitive data into the isolated display buffer;
selectively triggering usage of the isolated display buffer based at least in part on one of identification of data coming from the protected process being associated with a hardware protected environment or the protected process registering for protection with the trusted memory service layer;
disabling a blitter engine and enabling monitoring of the graphics translation table, via the operating system;

implementing the virtual sprite device via a sprite engine of a graphics processor and implementing the trusted memory service layer via a central processing unit; and wherein marking the portion of the graphics memory space as the access controlled graphics memory region comprises accessing a graphics translation table via a graphics translation table physical memory view implemented via the trusted memory service layer, and wherein the graphics translation table is configured to translate virtual graphics memory addresses to physical graphics memory addresses, wherein the virtual sprite device is a registered program having access to the isolated display buffer and the access controlled graphics memory region, wherein the trusted memory service layer is loaded and the unverified virtual sprite device is exposed prior to the operating system enumerating Peripheral Component Interconnect Express devices, wherein the trusted memory service layer is loaded after the operating system enumerating Peripheral Component Interconnect Express devices, and wherein exposing the unverified virtual sprite device comprises exposing the unverified virtual sprite device as a hot-plug device to invoke an operating system device manager to rescan a Peripheral Component Interconnect Express bus, wherein the information associated with the place holder display buffer comprises coordinates of the place holder display buffer, wherein the protected process comprises a process related to an online financial transaction, wherein the graphics memory space comprises a memory mapped input/output (MMIO) memory space, and wherein the trusted memory service layer comprises a virtual machine extension root mode component.

14. A system for securing display output data on a computer, comprising:
a display device configured to display data;
one or more processors communicatively coupled to the display device;
one or more memory stores communicatively coupled to the one or more processors;
a process address space;
a windows manager; and
a sprite pipeline comprising a trusted memory service layer, a virtual sprite device and an associated virtual sprite memory region, the sprite pipeline configured to:
register a process as a protected process via the trusted memory service layer;
mark a first portion of the process address space as an isolated display buffer associated with the protected process, and a second portion of the process address space as a place holder display buffer associated with the protected process;
mark a portion of a graphics memory space as an access controlled graphics memory region;
receive sensitive data in the isolated display buffer;
invoke, in response to receiving the sensitive data into the isolated display buffer, an application programming interface via a windows manager to receive information associated with the place holder display buffer associated with the protected process;
transfer the sensitive data in the isolated display buffer to the virtual sprite device memory region;
transfer the sensitive data in the virtual sprite device memory region to the access controlled graphics memory region; and provide the sensitive data in the access controlled graphics memory region to the display device, wherein the isolated display buffer is isolated from the operating system via a secure sprite pipeline to protect from potential malware access;

wherein the sensitive data is visually presented on the display device via a virtual sprite that overlays and emulates part of an underlying frame buffer data field such that a user is presented with little change in the appearance of the information displayed on the display device, wherein the place holder display buffer is open to the operating system, and wherein fake and/or non-sensitive data corresponding to the sensitive data is associated with the place holder display buffer so as to be open to the operating system and potentially susceptible to malware access.

15. The system of claim 14, further comprising:
an operating system implemented via the one or more processors,
wherein the sprite pipeline is further configured to:
expose, via the trusted memory service layer, an unverified virtual sprite device;
determine, via the trusted memory service layer, whether an unverified virtual sprite device driver is included on a provisioned whitelist,
if the unverified virtual sprite device driver is included on the provisioned whitelist, register, via the trusted memory service layer, the unverified virtual sprite device as the virtual sprite device, and
wherein the operating system is configured to:
load the trusted memory service layer;
load the unverified virtual sprite device driver associated with the unverified virtual sprite device.

16. The system of claim 14, further comprising:
an operating system implemented via the one or more processors,
wherein the sprite pipeline is further configured to:
expose, via the trusted memory service layer, an unverified virtual sprite device;
determine, via the trusted memory service layer, whether an unverified virtual sprite device driver is included on a provisioned whitelist;
if the unverified virtual sprite device driver is included on the provisioned whitelist, register, via the trusted memory service layer, the unverified virtual sprite device as the virtual sprite device, and
wherein the operating system is configured to:
load the trusted memory service layer;
load the unverified virtual sprite device driver associated with the unverified virtual sprite device; and
enumerate Peripheral Component Interconnect Express devices, wherein the trusted memory service layer is loaded and the unverified virtual sprite device is exposed prior to the operating system enumerating Peripheral Component Interconnect Express devices and wherein the unverified virtual sprite device is exposed as a hot-plug device to invoke an operating system device manager to rescan a Peripheral Component Interconnect Express bus.

17. The system of claim 14, wherein the sprite pipeline is further configured to:
create, via the trusted memory service layer, an isolated display buffer trusted memory view, wherein the isolated display buffer trusted memory view allows access to the isolated display buffer only via a registered program, and wherein the virtual sprite device is a registered program.

18. The system of claim 14, wherein the sprite pipeline is further configured to:
create, via the trusted memory service layer, an access controlled graphics memory region trusted memory view, wherein the access controlled graphics memory region trusted memory view allows access to the access controlled graphics memory region only via a registered program, and wherein the virtual sprite device is a registered program.

19. The system of claim 14, wherein the sprite pipeline is configured to mark the portion of the graphics memory space as the access controlled graphics memory region by accessing a graphics translation table via a graphics translation table physical memory view implemented via the trusted memory service layer, and wherein the graphics translation table is configured to translate virtual graphics memory addresses to physical graphics memory addresses.

20. The system of claim 14, wherein the information associated with the place holder display buffer comprises coordinates of the place holder display buffer.

21. The system of claim 14, wherein the protected process comprises a process related to an online financial transaction.

22. The system of claim 14, wherein the graphics memory space comprises a memory mapped input/output (MMIO) memory space.

23. The system of claim 14, wherein the trusted memory service layer is implemented via the one or more processors, the virtual sprite device is implemented via the sprite engine, the process address space is implemented via the one or more memory stores, the graphics memory space is implemented via the one or more memory stores, the windows manager is implemented via the one or more processors, the graphics translation table is implemented via a graphics driver, and the graphics driver is implemented via at least one of the one or more processors or the one or more graphics processors.

24. The system of claim 14, further comprising
one or more graphics processors communicatively coupled to the one or more processors, the one or more graphics processors comprising a sprite engine;
an operating system implemented via the one or more processors,
wherein the sprite pipeline is further configured to:
expose, via the trusted memory service layer, an unverified virtual sprite device;
determine, via the trusted memory service layer, whether an unverified virtual sprite device driver is included on a provisioned whitelist;
if the unverified virtual sprite device driver is included on the provisioned whitelist, register, via the trusted memory service layer, the unverified virtual sprite device as the virtual sprite device;
create, via the trusted memory service layer, an isolated display buffer trusted memory view, wherein the isolated display buffer trusted memory view allows access to the isolated display buffer only via a registered program, and wherein the virtual sprite device is a registered program;
create, via the trusted memory service layer, an access controlled graphics memory region trusted memory view, wherein the access controlled graphics memory region trusted memory view allows access to the access controlled graphics memory region only via a registered program, and wherein the virtual sprite device is a registered program;
receive the sensitive data into the isolated display buffer; and
selectively trigger usage of the isolated display buffer based at least in part on one of identification of data coming from the protected process being associated with a hardware protected environment or the protected process registering for protection with the trusted memory service layer,
wherein the operating system is configured to:
load the trusted memory service layer;
load the unverified virtual sprite device driver associated with the unverified virtual sprite device;
disable a blitter engine and enable monitoring of the graphics translation table;
enumerate Peripheral Component Interconnect Express devices, wherein the trusted memory service layer is loaded and the unverified virtual sprite device is exposed prior to the operating system enumerating Peripheral Component Interconnect Express devices and wherein the unverified virtual sprite device is exposed as a hotplug device to invoke an operating system device manager to rescan a Peripheral Component Interconnect Express bus,
wherein the sprite pipeline is configured to mark the portion of the graphics memory space as the access controlled graphics memory region by accessing a graphics translation table via a graphics translation table physical memory view implemented via the trusted memory service layer, and wherein the graphics translation table is configured to translate virtual graphics memory addresses to physical graphics memory addresses,
wherein the information associated with the place holder display buffer comprises coordinates of the place holder display buffer,
wherein the protected process comprises a process related to an online financial transaction,
wherein the graphics memory space comprises a memory mapped input/output (MMIO) memory space,
wherein the trusted memory service layer comprises a virtual machine extension root mode component,
wherein the virtual sprite device is a registered program having access to the isolated display buffer and the access controlled graphics memory region, and
wherein the trusted memory service layer is implemented via the one or more processors, the virtual sprite device is implemented via the sprite engine, the process address space is implemented via the one or more memory stores, the graphics memory space is implemented via the one or more memory stores, the windows manager is implemented via the one or more processors, the graphics translation table is implemented via a graphics driver, and the graphics driver is implemented via at least one of the one or more processors or the one or more graphics processors.

25. At least one non-transitory machine-readable medium comprising a plurality of instructions that in response to being executed on a computing device, cause the computing device to secure display output data by:
registering a process as a protected process via a trusted memory service layer;
marking a first portion of a process address space as an isolated display buffer associated with the protected process and a second portion of the process address space as a place holder display buffer associated with the protected process;
marking a portion of a graphics memory space as an access controlled graphics memory region;
providing a virtual sprite device and an associated virtual sprite memory region;

invoking, in response to a reception of sensitive data into the isolated display buffer associated with a protected process registered via a trusted memory service layer, an application programming interface to receive information from the place holder display buffer associated with the protected process;

transferring the sensitive data in the isolated display buffer to a virtual sprite device memory region via a virtual sprite device;

transferring the sensitive data in the virtual sprite device memory region to an access controlled graphics memory region for display via a display device; and providing the sensitive data in the access controlled graphics memory region to a display device, wherein the isolated display buffer is isolated from the operating system via a secure sprite pipeline to protect from potential malware access;

wherein the sensitive data is visually presented on the display device via a virtual sprite that overlays and emulates part of an underlying frame buffer data field such that a user is presented with little change in the appearance of the information displayed on the display device, wherein the place holder display buffer is open to the operating system, and wherein fake and/or non-sensitive data corresponding to the sensitive data is associated with the place holder display buffer so as to be open to the operating system and potentially susceptible to malware access.

26. The non-transitory machine readable medium of claim 25, further comprising instructions that in response to being executed on the computing device, cause the computing device to securely display output data by:

loading the trusted memory service layer;

exposing, via the trusted memory service layer, an unverified virtual sprite device;

loading, via an operating system, an unverified virtual sprite device driver associated with the unverified virtual sprite device;

determining, via the trusted memory service layer, whether the unverified virtual sprite device driver is included on a provisioned whitelist;

if the unverified virtual sprite device driver is included on the provisioned whitelist, registering, via the trusted memory service layer, the unverified virtual sprite device as the virtual sprite device;

creating, via the trusted memory service layer, an isolated display buffer trusted memory view, wherein the isolated display buffer trusted memory view allows access to the isolated display buffer only via a registered program, and wherein the virtual sprite device is a registered program;

creating, via the trusted memory service layer, an access controlled graphics memory region trusted memory view, wherein the access controlled graphics memory region trusted memory view allows access to the access controlled graphics memory region only via a registered program, and wherein the virtual sprite device is a registered program;

receiving the sensitive data into the isolated display buffer;

selectively triggering usage of the isolated display buffer based at least in part on one of identification of data coming from the protected process being associated with a hardware protected environment or the protected process registering for protection with the trusted memory service layer;

disabling a blitter engine and enabling monitoring of the graphics translation table, via the operating system;

implementing the virtual sprite device via a sprite engine of a graphics processor and implementing the trusted memory service layer via a central processing unit; and wherein marking the portion of the graphics memory space as the access controlled graphics memory region comprises accessing a graphics translation table via a graphics translation table physical memory view implemented via the trusted memory service layer, and wherein the graphics translation table is configured to translate virtual graphics memory addresses to physical graphics memory addresses, wherein the virtual sprite device is a registered program having access to the isolated display buffer and the access controlled graphics memory region, wherein the trusted memory service layer is loaded and the unverified virtual sprite device is exposed prior to the operating system enumerating Peripheral Component Interconnect Express devices, wherein the trusted memory service layer is loaded after the operating system enumerating Peripheral Component Interconnect Express devices, and wherein exposing the unverified virtual sprite device comprises exposing the unverified virtual sprite device as a hot-plug device to invoke an operating system device manager to rescan a Peripheral Component Interconnect Express bus, wherein the information associated with the place holder display buffer comprises coordinates of the place holder display buffer, wherein the protected process comprises a process related to an online financial transaction, wherein the graphics memory space comprises a memory mapped input/output (MMIO) memory space, and wherein the trusted memory service layer comprises a virtual machine extension root mode component.

\* \* \* \* \*